United States Patent [19]

Kiekens et al.

[11] Patent Number: 5,380,634
[45] Date of Patent: Jan. 10, 1995

[54] FILTER DYES FOR RAPID PROCESSING APPLICATIONS

[75] Inventors: Eric Kiekens, Kessel-Lo; Paul Callant, Edegem, both of Belgium

[73] Assignee: AGFA-Gevaert, N.V., Mortsel, Belgium

[21] Appl. No.: 118,739

[22] Filed: Sep. 10, 1993

[30] Foreign Application Priority Data

Sep. 11, 1992 [EP] European Pat. Off. ........... 92202768

[51] Int. Cl.$^6$ .............................................. G03C 1/46
[52] U.S. Cl. ..................................... 430/507; 430/510;
430/517; 430/519; 430/522; 430/523; 430/591;
430/139; 430/966; 430/958
[58] Field of Search ............... 430/507, 510, 517, 519,
430/522, 523, 591, 139, 966, 963, 958

[56] References Cited

U.S. PATENT DOCUMENTS

| | | | |
|---|---|---|---|
| 4,857,446 | 8/1989 | Diehl et al. | 430/510 |
| 4,866,029 | 9/1989 | Evans et al. | 503/227 |
| 4,904,565 | 2/1990 | Schmidt et al. | 430/510 |
| 4,940,654 | 7/1990 | Diehl et al. | 430/522 |
| 4,948,717 | 8/1990 | Diehl et al. | 430/510 |
| 4,988,611 | 1/1991 | Anderson et al. | 430/510 |

FOREIGN PATENT DOCUMENTS

| | | | |
|---|---|---|---|
| 0476187 | 11/1952 | Italy | 430/522 |
| 0185038 | 11/1981 | Japan | 430/522 |
| 3008736 | 1/1988 | Japan | 430/522 |
| 1293343 | 11/1989 | Japan | 430/522 |

*Primary Examiner*—Thomas R. Neville
*Attorney, Agent, or Firm*—Breiner & Breiner

[57] ABSTRACT

The synthesis and the application of new dyes is described, said new dyes being incorporated in non-migratory state in hydrophilic colloid layers of photographic materials wherefrom they can be rapidly removed after being quickly decolourized in alkaline aqueous liquids used in the processing of said materials. The filter dyes have an ester function or a derivative therefrom as a substituent at the mono- or trimethine chain.

11 Claims, No Drawings

FILTER DYES FOR RAPID PROCESSING APPLICATIONS

DESCRIPTION

1. Field of the Invention.

The present invention relates to filter dyes and their use as antihalation and cross-over dyes in photographic elements.

2. Background of the Invention

Non-spectrally sensitizing dyes are widely used in photographic elements, particularly in photographic elements of the silver halide type. They may be used in a photosensitive silver halide emulsion layer as screening dyes, in an undercoat adjacent to the photosensitive layer and/or in a backing layer on the side of the support opposite to the photosensitive layer(s) to absorb reflected and scattered light thereby serving as antihalation dye or in an overcoat or interlayer to shield a particular photosensitive layer against undesired exposure being therefore referred to as filter or absorber dye, thereby adjusting the sensitivity of a photographic element as required in the production specifications.

For example in order to improve image sharpness an absorber dye can be present in one or more filter layers between silver halide emulsion layers that are coated at opposite sides of a transparent film support of an X-ray recording material. The imagewise exposure of said recording material proceeds in a cassette between a pair of X-ray intensifying screens that each are held in contact with an adjacent silver halide emulsion layer. By said arrangement the imaging light that would cross the support and to some extent becomes scattered thereby, is considerably attenuated and cannot give rise to an unsharp image in an opposite silver halide emulsion layer.

Spectrally the dye absorption spectrum should approximately be equal to the sensitivity spectrum of the corresponding silver halide emulsion in the layer of which a sharp image has to be reproduced.

On the one hand it is very important that filter dyes remain, i.e. that they are non-migratory, in the layer wherein they have been incorporated especially when this layer is in direct contact with the silver halide emulsion layer in order to prevent a desensitizing action on the silver halide. On the other hand the filter dyes may not stain the photographic material after image processing. Therefore preference is given to filter dyes that decolorize or can be removed from the photographic element in the processing stage. This requirement is nowadays becoming more and more stringent as rapid processing times are of increasing interest.

As described in U.S. Pat No. 3,560,214 dyes comprising a carboxyl and phenyl substituted pyrazoline nucleus linked through a methine group to a dialkylaminophenyl group can be removed relatively easily in alkaline aqueous processing liquids but lack sufficient fastness to diffusion in hydrophilic colloid layers.

Other filter dyes characterized by the presence of a 2-pyrazolin-5-one nucleus substituted with a carboxyphenyl group and including a methine group or chain linked to a dialkylamino group are described in U.S. Pat. No. 4,857,446. The decolorization of said filter dyes proceeds very rapidly in alkaline aqueous processing baths. The monomethine dyes have an absorption spectrum of which the maximum is in the shorter wavelength range of the visible spectrum so that normally a second filter dye is needed to block or absorb green light and even a third one to absorb radiations of longer wavelengths, e.g. radiations in the red or even in the infrared region.

Once a filter dye has been selected, the problem is how to get the filter dye in a coated layer so that all the requirements mentioned previously are met.

One of the possibilities is to make use of solid particle dispersions of water insoluble dyes as has been described in EP 0,384,633 A2; EP 0,323,729 A2; EP 0,274,723 B1, EP 0,276,566 B1, EP 0,351,593 A2 and U.S. Pat. Nos. 4,900,653; 4,904,565; 4,949,654; 4,940,654; 4,948,717; 4,988,611 and 4,803,150.

Another possibility is offered in Research Disclosure 19551 (July 1980) which describes an approach of associating hydrofobic compounds with latex polymer particles.

EP 0,401,709 A2 describes the dissolution of hydrophobic dyes into oil droplets being substantially insoluble in water and the preparation of the corresponding oilformer dispersions or loaded polymer latex dispersions.

To prevent dye wandering, the dye is often coated with a mordant to bind the dye in the layer in which it is coated as is e.g. illustrated in U.S. Pat. No. 2,527,583. As dye mordants polymers are often used.

Another possibility is offered by adsorption of dyes at the surface of very fine light-insensitive silver halide crystals with the expectable disadvantages of the coating of more silver halide crystals and possibly fixation difficulties.

Very few dyes satisfy the above requirements especially when rapid processing is concerned. Moreover, apart from the requirement of non-diffusibility and of rapid decolourizing or removal by rapid processing that the dyes should meet, they should have high stability in the photographic material, not only under the influence of the ingredients present in the emulsion layers prior to coating, but especially under severe storage conditions of the packed material e.g. under circumstances of high temperatures and high degrees of humidity.

OBJECTS AND SUMMARY OF THE INVENTION

It is an object of the present invention to provide new dyes that can be incorporated in non-migratory state in hydrophilic colloid layers of photographic materials wherefrom they can be rapidly removed in alkaline aqueous liquids used in the processing of said materials.

it is a further object of the invention to provide said new dyes providing high density in the required spectral region, thereby reducing the cross-over effect in double-sided photographic elements, particularly radiographic materials.

Other objects will become apparent from the description hereinafter.

in accordance with the present invention dyes are provided corresponding to the following general formula (I):

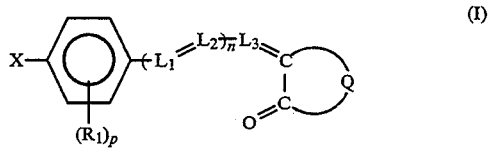

wherein n represents 0 or 1;

p represents 0, 1 or 2;

Q represents the atoms necessary to form an acidic nucleus such as pyrazolone, barbituric acid, thiobarbituric acid, rhodanine, hydantoine, oxazolidindione, thio-oxazolidindione, isoxazolinone etc.;

$R_1$ represents hydrogen, substituted or unsubstituted alkyl, substituted or unsubstituted aryl, $COOR_2$, $NHCOR_3$ or $NHSO_2R_4$ with $R_2$ representing hydrogen or substituted or unsubstituted alkyl, $R_3$ and $R_4$ representing substituted or unsubstituted alkyl, or substituted or unsubstituted aryl;

X represents $OR_5$, $SR_5$ or $NR_6R_7$ wherein $R_5$ represents H, substituted or unsubstituted alkyl, substituted or unsubstituted aryl and each of $R_6$ and $R_7$ which may be the same or different represents hydrogen, substituted or unsubstituted alkyl, substituted or unsubstituted aryl or the necessary atoms, e.g. trimethylene, to form a ring together with the N-atom to which they are attached and the C-atom of the phenylene ring in ortho position with respect to said N-atom; $R_6$ and $R_7$ together may also represent the necessary atoms to form a ring with the N-atom to which they are attached;

$L_1$, $L_2$, $L_3$ represent substituted or unsubstituted methine with the proviso that at least one of $L_1$, $L_2$ or $L_3$ must be substituted by —$COOR_8$ $R_8$ represents hydrogen, substituted or unsubstituted alkyl, substituted or unsubstituted aryl, $NH_2$, $NHR_9$, $NR_{10}R_{11}$ with $R_9$, $R_{10}$ and $R_{11}$ representing a substituted or unsubstituted alkyl, or a substituted or unsubstituted aryl.

and wherein at least one of $R_1$ to $R_{11}$ contains an ionizable group.

More preferably dyes in accordance with this invention correspond to formula (II):

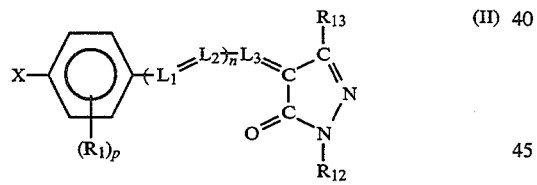

(II)

wherein each of n, p, X, $R_1$, $L_1$, $L_2$ and $L_3$ has one of the meanings given hereinbefore and wherein $R_{12}$ represents hydrogen, substituted or unsubstituted alkyl, substituted or unsubstituted aryl, or sulfolanyl, $R_{13}$ represents hydrogen, substituted or unsubstituted alkyl, substituted or unsubstituted aryl, $COOR_2$, $NHCOR_3$, $NHSO_2R_4$, with $R_2$, $R_3$ and $R_4$ representing hydrogen, substituted or unsubstituted alkyl, or substituted or unsubstituted aryl, and wherein at least one of $R_1$ to $R_{13}$ contains an alkali-soluble group.

In accordance with the present invention a photographic element is provided comprising a support and at least one photo-sensitive silver halide emulsion layer, wherein said element comprises, dispersed in a hydrophilic water-permeable colloid binder, e.g. gelatin, at least one dye according to the above general formula.

Further in accordance with the present invention a photographic element is provided comprising a support and at least one photosensitive silver halide emulsion layer, wherein said element comprises said at least one dye according to the above formula in a solid particle state by acidifying the slightly alkaline coating solution "in situ" at the moment the coating solution is applied.

DETAILED DESCRIPTION OF THE INVENTION

The presence of an ester group as a substituent on the methine chain is very characteristic for the dyes suitable for use in this invention.

The absence of this ester-group does not only affect the spectral behaviour, shifting the absorption to shorter wavelengths, but also doesn't allow the dye to be decolourized quickly enough, as required in rapid processing conditions, especially for 38 s processing cycles.

The synthesis of dyes according to the present invention may follow different suitable ways.

Generally at the electron deficient alpha-keto-carbon atom of an alpha-keto-ester derivative a nucleophilic attack of a specific electron-donating site of e.g. a pyrazolone or a derivative thereof may give rise to the desired monomethine dye with an ester substitution onto the methine chain, this way of synthesizing said dye being illustrated in reaction scheme 1 given hereinafter.

Reaction scheme 1.

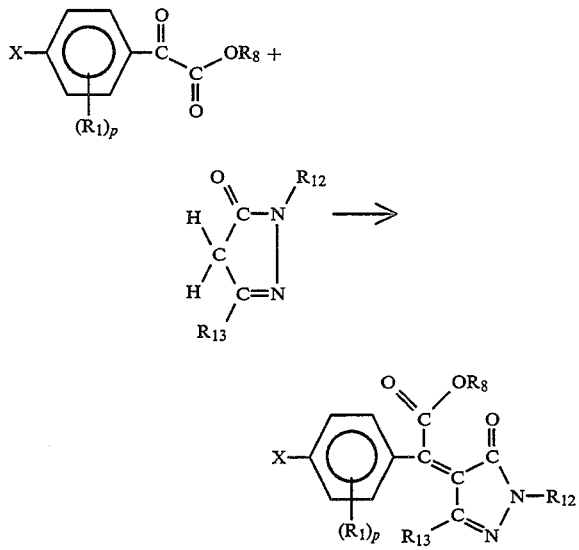

A reaction way to synthesize trimethine dyes with an ester substitution at the methine chain in alpha position versus a pyrazolone nucleus is given in reaction scheme 2. An acetylacetic ester is attacked at the electron deficient C-atom by an electron donating C-atom of a pyrazolone nucleus. In a second reaction step this intermediate product reacts with p-benzaldehyd, para-substituted with a mono- or disubstituted aminogroup.

Other heterocyclic nuclei are possible as e.g. substituted or unsubstituted pyrazolones, barbiturics, 2-thiobarbiturics, rhodanines, hydantoins, 2-hydantoins, 4-hydantioins, 2,4-oxazolidindiones, 2-thio-2,4-oxazolidindiones, isoxazolinones etc.

Reaction scheme 2: Synthesis of mono- and trimethine dyes.

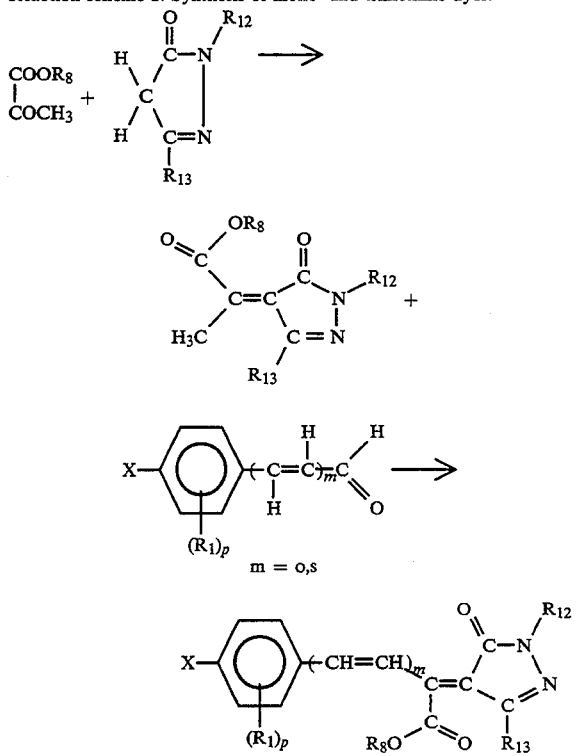

Mono- and trimethine dyes with the ester-function in β-position can be synthesized in the following way:

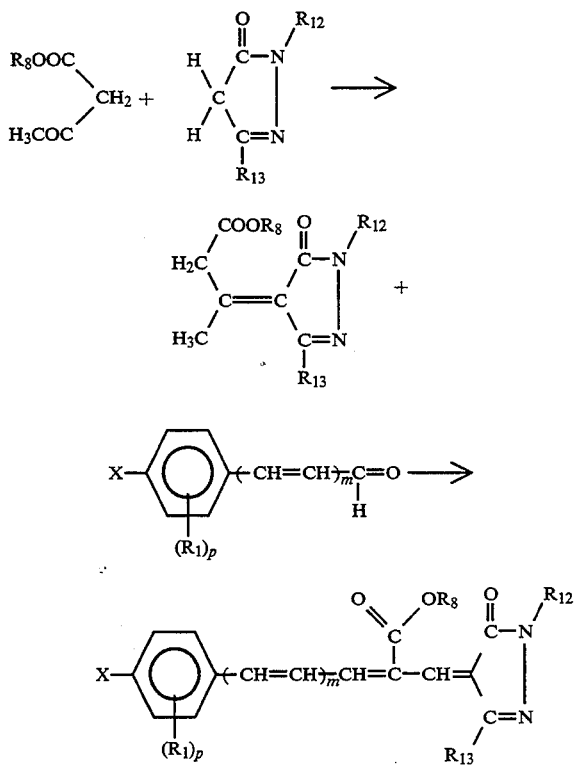

Variations can be found in using other heterocyclic nuclei and in the substitution at the methine chain of the ester-function by an acidic group making the dye soluble in aqueous alkaline medium, $R_8$ thus containing an ionizable group.

From the prior art it is known that the presence of one or more weakly-acidic groups in the dyes is important to provide sufficient non-migratory character at coating pH values in the range of 4 to 8. In the acid pH range the filter dyes according to the present invention can be incorporated in aqueous coating compositions in dispersed form by using commercial mixing devices for making colloidal dispersions, e.g. in gelatin. The size of the dye particles obtained is chosen to facilitate coating and rapid decolouration of the dye. Where the dyes are initially crystallized in the form of particles larger than desired for use, conventional techniques for achieving smaller particle sizes can be employed, such as ball milling, roller milling, sand milling and the like. Solid particle dispersions as described herinbefore have a mean diameter of less than 10 μm, more preferably less than 1 μm and still more preferably less than 0.1 μm. The solid particle dispersions cannot only be prepared in the presence of gelatin as a colloidal medium but also e.g. in colloidal silica. A preferred method of preparing an aqueous solid particle dispersion of a photographically useful compound, for incorporation in one of the layers of a photographic silver halide material comprises the steps of dissolving a non-watersoluble but alkali-soluble compound in an aqueous alkaline solution, if necessary with the help of an organic water soluble solvent precipitating the said compound from said solution in the presence of colloidal silica sol, preferably in the further presence of a dispersing agent by lowering the pH of the solution, e.g. by neutralizing with an aqueous acidic solution removing water-soluble salts formed by the precipitation and any organic solvent used, and concentrating the dispersion either during or after the precipitation by dialysis or ultrafiltration or after precipitation by flocculation and decantation, followed by washing and further decantation.

Said precipitation in the presence of colloidal silica sol preferably occurs in the further presence of a dispersing agent, like e.g. a 2-N,N,N-trialkylamino-acetic acid and can be performed by simultaneous addition of an aqueous alkaline solution comprising the alkaline-soluble compound and an aqueous acidic solution, to a stirred solution comprising the total or partial amount of colloidal silica sol and of dispersing agent while keeping the pH constant, preferably at a value of less than 6.0, the rest of said amount if any being present in at least one of said solutions.

Preferred dispersing agents used during the preparation of solid silica dispersions are one or more partially ionizable polymer(s) or one or more surfactant(s) or a combination thereof.

Another possibility to obtain ultra fine dye dispersions consists in acidifying a slightly alkaline coating composition "in situ" just before coating it at the supporting layer. It has been found that the application of this dosage technique allows us to obtain the dyes in a very fine solid particle form, homogeneously divided into the coated layer so that solid particles can hardly be observed even by means of microscopic techniques.

The non-diffusing dyes the synthesis of which has been described hereinbefore and which are added to a hydrophilic layer of a photographic element as a solid particle have a mean diameter of less than 10 μm, more preferably less than 1 μm and still more preferably less than 0.1 μm.

At a pH of at least 10 the dispersed filter dyes are easily solubilized so they are removed almost completely from a hydrophilic waterpermeable colloid layer of a photographic silver halide emulsion material by its common alkaline aqueous liquid processing and leave almost no residual stain. The presence of sulfite in the processing solution contributes to a more rapid discoloration of the filter dyes.

Particularly for 38 s processing cycles, comprising a development, fixing, rinsing and drying step, photographic elements with dyes according to this invention in one or more hydrophilic layers are very rapidly discoloured.

The hydrophilic colloidal layer(s) in which the dye(s) are incorporated in accordance with the present invention can be a backing layer, an antihalation undercoating layer, a silver halide emulsion layer, an intermediate layer and a protective outermost layer.

Emulsion layers in accordance with this invention may contain light-sensitive silver halide crystals with a diameter of at least 0.1 μm. Intermediate layers in accordance with the present invention may contain very fine light-insensitive silver halide particles with a diameter of 10 to 100 nm known as Lippmann emulsions, incorporated into said layers e.g. to serve as scavangers to prevent oxidised developer products to migrate into adjacent layers.

The layers previously mentioned as suitable layers comprising a filter or antihalation dye may be incorporated in e.g. X-ray materials, graphic arts materials, diffusion transfer materials, black and white or colour cinematographic materials etc.

According to a preferred embodiment the dye or dyes are incorporated in a antihalation back coating layer or a antihalation undercoating layer or layers, especially for double-coated materials as e.g. X-ray photographic materials.

In an outermost layer or layers or in an emulsion layer or layers one or more dyes according to this invention may be used to adjust the sensitivity of the photographic material as required by the production specifications. So it is possible to apply a dosing feeder just before coating the hydrophilic layer concerned and to control the production of the photographic material in this way, the dye(s) being present in the form of a gelatinous dispersion or a solid particle state.

The dyes absorbing in the green spectral range which are mostly trimethine dyes can be used advantageously between silver halide emulsion layers of double-sided emulsion coated (duplitized) photographic film material applied in X-ray recording for use with green light emitting X-ray conversion phosphor screens. By said arrangement the green light that would cross the support and to some extent become scattered thereby, is considerably attenuated and cannot give rise to an unsharp image in an opposite silver halide emulsion layer.

Green light emitting phosphor screens and their use in combination with green sensitive silver halide emulsion layers of a double side coated (duplitized) film are described e.g. in U.S. Pat. No. 4,130,428, wherein also several measures, e.g. the use of filter dyes, to reduce cross-over light have been described.

In a particular embodiment of the present invention the dyes are incorporated into a radiographic material that is provided at both sides of the support with a silver halide emulsion layer and an antistress layer as a protective layer coated thereover. The radiographic material preferably has on both sides of the film support silver halide emulsion coatings that are split into two distinctive emulsion layers having silver halide crystals of different average grain size one of which is a high speed emulsion layer and the other is a low speed emulsion layer; the high speed emulsion layer being situated at a larger distance from the support than the low speed emulsion layer. This way the sensitometric curve can be fine-tuned, giving the perfect profile for the specific application. The layer arrangement may also be opposite to the previously cited sequence in order to get a higher contrast. Moreover even without using a separate anticrossover layer this layer arrangement reduces crossover, especially in the critical low density area. In the presence of crossover preventing antihalation undercoat layers containing the dyes according to this invention the crossover reduction is improved without leaving a colour stain upon processing, especially upon rapid processing in less than 60 seconds, preferably in 38 seconds as a reference processing time of materials with high-throughput.

All combinations of symmetrically double-side coated films with a symmetric or asymmetric set of intensifying screens or combinations of double-side coated films with asymmetric emulsion layers, whether or not duplitized, in combination with a symmetric or asymmetric set of intensifying screens can be useful, depending on the specific needs required.

According to another embodiment said green-light absorbing dyes can be used in a antihalation layer of a photographic silver halide emulsion material in order to improve image sharpness by absorbing exposure light penetrating the emulsion layer(s) into the direction of the support. The use of said mainly green light absorbing dyes in a antihalation layer is particularly advantageous in silver halide emulsion materials that are made spectrally sensitive to green light and of which the exposure proceeds with a green light emitting laser e.g. argon ion laser the main power of which is emitted at 488 and 514 nm.

The following examples illustrate the present invention without however limiting it thereto.

EXAMPLES

1. Synthesis of the dyes

In Table I, formulae of the dyes as synthesized are given. In accordance with the general formula (I) $L_1$, $L_2$ and $L_3$ each represent a methine group.

One H-atom of $L_3$ is substituted by $—COOR_8$. In each of these examples, p equals 0. In accordance with the preferred general formula (II) Q represents a substituted pyrazolone nucleus. The substituents $R_{12}$ and $R_{13}$ are given in Table I for the corresponding examples.

TABLE I

| | Formulae of the synthesized dyes. | | | | |
|---|---|---|---|---|---|
| Example No. | n= | X | $R_8$ | $R_{13}$ | $R_{12}$ |
| 1 | 1 | $N(CH_3)_2$ | $C_2H_5$ | $CH_3$ | $C_6H_4COOH$ |
| 2 | 0 | $O(CH_3)$ | $C_2H_5$ | $CH_3$ | $C_6H_4COOH$ |
| 3 | 0 | $N(CH_3)_2$ | $C_2H_5$ | $CH_3$ | $C_6H_4COOH$ |
| 4 | 0 | $N(CH_3)_2$ | H | $CH_3$ | $C_6H_5$ |
| 5 | 1 | OH | $C_2H_5$ | $CH_3$ | $C_6H_4COOH$ |
| 6 | 1 | $N(CH_3)_2$ | $C_2H_5$ | $CH_3$ | $C_6H_4COOH$ |

Example No. 1

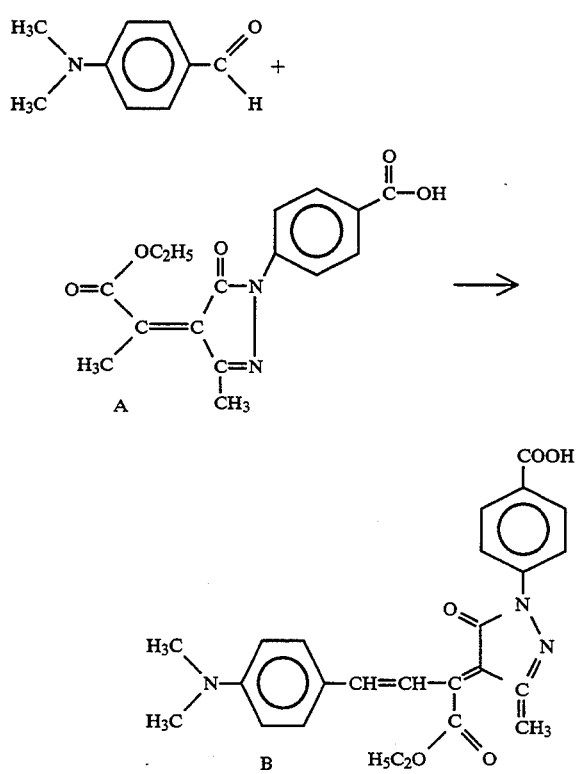

1.1. A solution of 1-(4-carboxyphenyl)-3-methyl-5-pyrazolone (43.6 g) in 400 ml of dimethylacetamide was cooled in an ice bath. To this solution were added 24.8 ml of ethyl pyruvate and 27.2 g of zinc chloride. After 1 hr, 1 l of water was added, causing the essentially pure intermediate product A to precipitate in an amount of 40.2 g.

1.2. A solution of the intermediate product A (44 g), p-dimethylaminobenzaldehyde (41.7 g) and zinc chloride (38 g) in methanol (1.1 l) was stirred at room temperature during 24 hrs. The dye B crystallised and was filtered (amount: 43.8 g).

Example No. 2

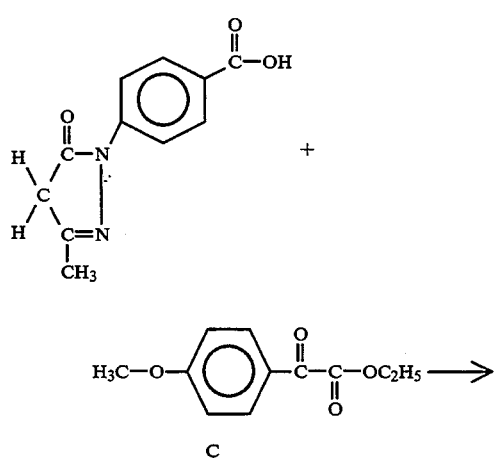

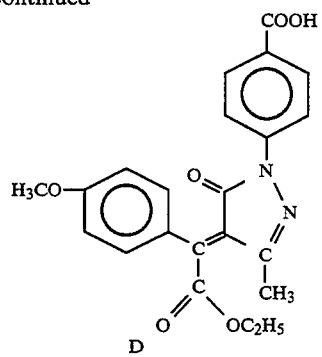

2.1. Aluminum trichloride in an amount of 73.3 g was suspended in 500 ml of dichloromethane. To this suspension was added 58.6 ml of ethyl oxalyl chloride. To the cooled reaction mixture was added 54.6 ml anisole. After stirring overnight at room temperature, 500 ml of water was added. The organic layer was evaporated and the resulting yellow-brown oil purified by chromatography to yield 95 g of product C as a yellowish oil.

2.2. 62.4 g of the above intermediate and 32.7 g of 1-(4-carboxyphenyl)-3-methyl-5-pyrazolone were dissolved in 300 ml of dimethyl acetamide. To this solution was added 40.8 g of zinc chloride. The reaction mixture was refluxed during 2 hrs. Then, 500 ml of water was added, causing the yellow dye D to precipitate in an amount of 47.4 g.

Example No. 3

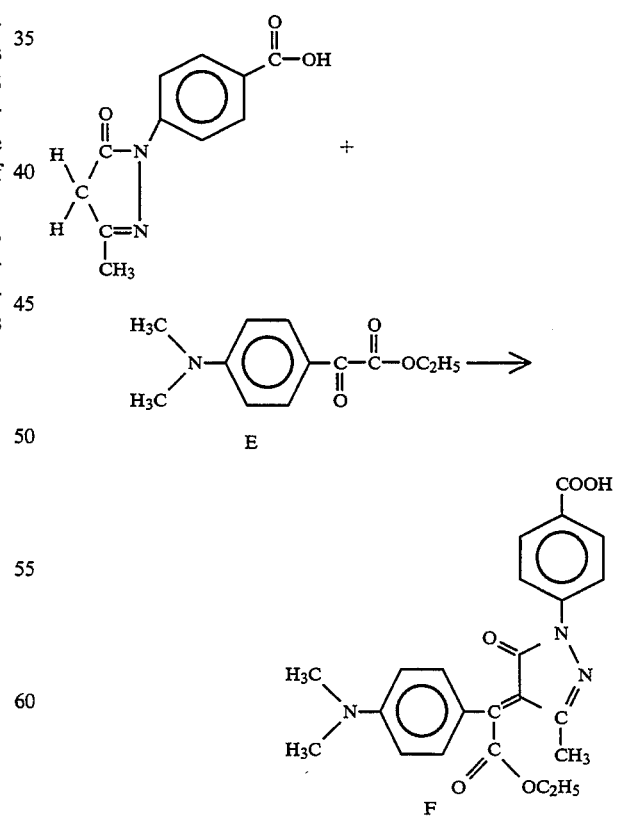

3.1. The intermediate product E was prepared according to the method described in:
Staudinger, Stockmann; Chem. Ber. 42; 224(1909)

Alternative synthetic methods can be found in:
Guyot; Compt. Rend. 144; 1120(1907)
Miller, Manhardt; Chem. Ber. 10; 2081(1877)

3.2. 21.8 g of product E, 22.1 g 1-(4-carboxyphenyl)-3-methyl-5-pyrazolone, 1 ml of piperidine and 0.5 ml of acetic acid were refluxed in 500 ml of ethanol for 38 hrs. The red precipitate F was filtered off and rinsed with ethanol. Amount of product F obtained: 38.3 g.

Example No. 4

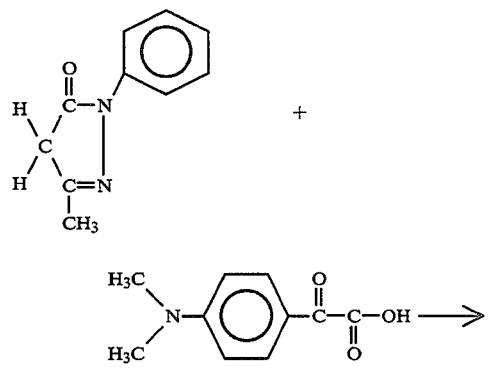

G

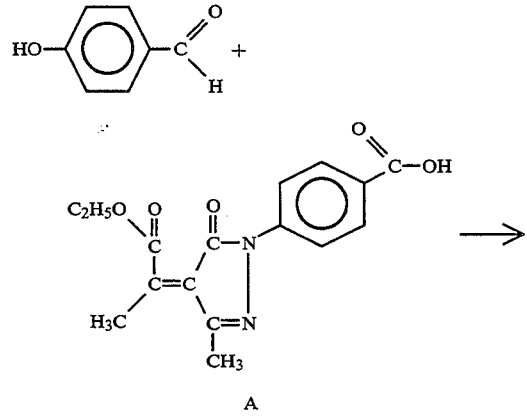

H 4.1. The intermediate product G was synthesized according to the method described in
Staudinger, Stockmann; Chem. Ber. 42; 224(1909)

4.2. 1.93 g of the intermediate product G, 1.74 g of 1-phenyl-3-methyl-5-pyrazolone and 0.13 g of piperidine acetate were refluxed in 25 ml of ethanol for 5 hrs. The resulting red precipitate was collected and washed with ethanol. 1.7 g of product H was obtained.

Example No. 5

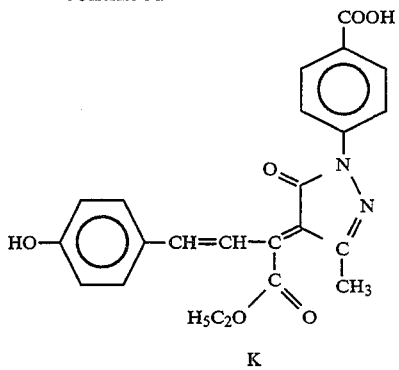

K 31.6 g of the intermediate product A, 24.4 g of 4-hydroxybenzaldehyde and 27.2 g of zinc chloride were refluxed in 400 ml ethanol during 2 hrs. The reaction mixture was then cooled in an ice bath. The precipitated dye was filtered and rinsed with ethanol. 55.6 g of the dye was obtained.

Example No. 6

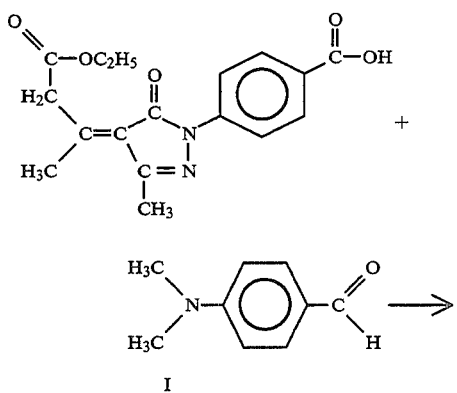

I 6.1. 43.6 g of 1-(4-carboxyphenyl)-3-methyl-5-pyrazolone was mixed with 600 ml of ethyl acetoacetate and 3 ml of triethylamine. This mixture was stirred on an oil bath at 100° C. during 5 hrs. After cooling, the precipitate was collected and recrystallized in ethanol. Intermediate product I was obtained in an amount of 46.2 g.

6.2. 46.2 g of the intermediate product I, 41.7 g of 4-dimethylaminobenzaldehyde and 38.1 g of zinc chloride were refluxed in 2 l ethanol during 5 hrs. The precipitate was recrystallized from an ethanol/dimethylacetamide mixture. An amount of 45.2 g of product J was obtained.

2. Optical properties of the dyes coated as a dispersion on a film support.

The formulae of the dyes as used in the further examples are given hereinafter.

Dye 1 (invention)

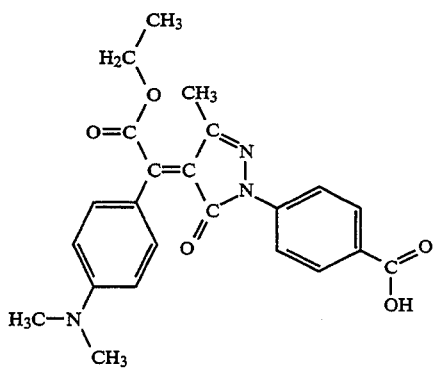
(I)

This structure looks like Example No. 3, except for $R_{11}$: $C_2H_5$— is replaced by $CH_3$—.

Dye 2 (comparative, corresponding to Dye 1 of Table 1 of U.S. Pat. No. 4,857,446)

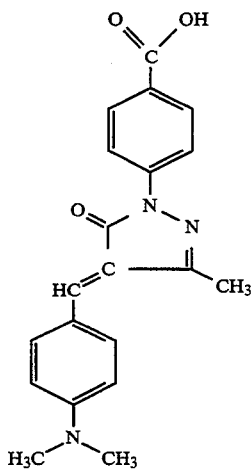
(II)

Dye 3 (comparative, corresponding to Dye 11 of Table 2 of U.S. Pat. No. 4,857,446)

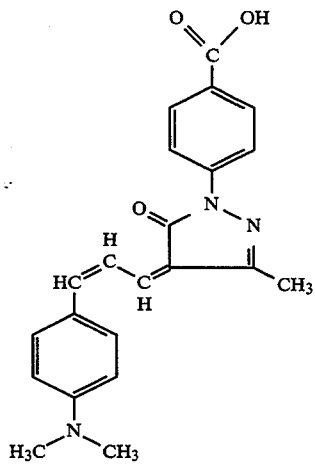
(III)

2. Optical properties of the dyes coated as a dispersion on a film support.

Procedure for the preparation of the dye dispersions 10 g of filter dye was dispersed at 40° C. in 200 g of a 10% aqueous gelatin solution by using a rotating pearl mill containing as a milling material zirconium oxide pearls sizing 0.6 to 0.8 μm. At a dye particle size of about 1 μn the milling process was stopped and the dispersion separated from the milling material.

Coating procedure

Chromium (III) acetate as a hardening agent and an additional amount of gelatin were added to the above prepared dye dispersion kept at a temperature of 36° C. and a pH value of 6.1.

Said dispersion was double-side coated and dried on a polyethylene terephtalate film support of 175 μm thickness in order to obtain at each side a dye coverage of 0.1 g/m², a gelatin coverage of 1 g/m² and a coverage of hardening agent of 0.016 g/m².

In Table II the maximum absorption wavelength (λ-max) of the coated materials is given together with the half band width (HWB) values of the absorption wavelength expressed in nm, the density (D) measured at λ-max and at 540 nm, the latter being the main emission wavelength of a $Gd_2O_2S$:Tb phosphor used in X-ray intensifying screens. Absorption spectra were measured at a Diano Corporation Match Scan spectrophotometer with diffuse light.

TABLE II

| | Optical properties of dyes in the coated layer. | | | |
|---|---|---|---|---|
| Dye No. | λ-max (nm) | HBW (nm) | D at λ-max | D at 540 nm |
| 1 (invention) | 500 | 172 | 0.38 | 0.34 |
| 2 (comparison) | 455 | 176 | 0.43 | 0.24 |
| 3 (comparison) | 500 | 231 | 0.63 | 0.60 |

In order to assess the resistance to diffusion of the dye in the coated layer, the above described coating of each dye was rinsed with destilled water at 20° C. for 5 minutes. Before and after rinsing the spectral density D at λ-max was measured at the double-side coated material as has been summarized in Table III.

TABLE III

| | Density measured at the maximum absorption wavelength λ-max. | |
|---|---|---|
| | D at λ-max | |
| Dye No. | Before rinsing | After rinsing |
| 1 (invention) | 0.38 | 0.36 |
| 2 (comparison) | 0.43 | 0.43 |
| 3 (comparison) | 0.63 | 0.62 |

The negligible change in spectral density D at λ-max before and after rinsing with water is a measure for the resistance to diffusion of the dye in the coating layer.

3. Decolourizing properties of the dyes, coated in an anti-crossover layer, under practical processing conditions.

To check the decolourizing properties of the dyes in practical circumstances the dyes were coated on both sides of a polyethylene terephtalate film support in an anti-cross-over layer and were overcoated with an emulsion layer and a protective layer. Next, the samples were processed in a 90 or 38 seconds processing cycle and the spectral density at λ-max of the dye was determined. A low value of this spectral density means that the dye decolourizes well during the processing. The composition of the sample coatings, developer and fixers and the processing conditions are given hereinafter:
Composition of the coated samples.

In the emulsion layer no use was made of a spectral sensitizer because of the interference of its absorption spectrum with the dyes under investigation. The coating weight, expressed in g/m² per side of the different layers, was as follows:

| anti-crossover layer: | |
|---|---|
| gelatin | 1 g/m² |
| dye see TABLE IV | |
| chromium(III) acetate | 0.016 g/m² |
| emulsion layer: all amounts are given in g/m² | |
| AgBr(I)-crystals (2 mole % of iodide; 98 mole % of bromide) (as AgNO₃) | 4.15 |
| gelatin | 2.10 |
| 4-hydroxy-6-methyl-1,3,3a,7-tetraazaindene | 0.006 |
| sorbitol | 0.20 |
| protective layer: | |
| gelatin | 1.10 |
| polymethylmethacrylate (average particle diameter: 6 μm) | 0.023 |
| formaldehyde | 0.10 |

Processing conditions and composition of developers.
  Conditions for the 90 seconds processing cycle.
    processing machine : CURIX 402 (Agfa-Gevaert trade name) with the following time (in seconds (sec.)) and temperature (in °C.) characteristics:

| loading | 3.4 sec. |
|---|---|
| developing | 23.4 sec./ 35° C. in developer AGFA G138 (trade name) |
| cross-over | 3.8 sec. |
| fixing | 15.7 sec./35° C. in fixer AGFA G334 (trade name) |
| cross-over | 3.8 sec. |
| rinsing | 15.7 sec./20° C. |
| drying | 32.2 sec. (cross-over time included) |
| total time | 98.0 sec. |

Conditions for the 38 seconds processing cycle.
  processing machine: CURIX HT530 (Agfa-Gevaert trade name) with the following time (in seconds (sec.)) and temperature (in °C.) characteristics:

| loading | 0.2 sec. |
|---|---|
| developing | 9.3 sec./35° C. in developer II described hereinafter |
| cross-over | 1.4 sec. |
| rinsing | 0.9 sec. |
| cross-over | 1.5 sec. |
| fixing | 6.6 sec./35° C. in fixer II described hereinafter |
| cross-over | 2.0 sec. |
| rinsing | 4.4 sec. |
| cross-over | 4.6 sec. |
| drying | 6.7 sec. |
| total time | 37.6 sec. |

Composition of the three-part developer for the 38 seconds processing cycle

| concentrated part A | |
|---|---|
| hydroquinone | 106.0 g |
| potassium sulphite (65% solution) | 249.0 g |
| potassium bromide | 12.0 g |
| ethylenediamine tetraacetic acid, sodium salt trihydrate | 9.6 g |
| potassium hydroxyde | 77.0 g |
| potassium carbonate | 38.0 g |
| sodiumtetraborate, decahydrate | 70.0 g |
| 5-methylbenzotriazole | 0.076 g |
| diethylene glycol | 56.0 g |
| demineralized water to make 1 liter | |
| pH adjusted to 11.80 at 25° C. with potassium hydroxide. | |
| concentrated part B | |
| phenidone (1-phenyl-3-pyrazolidinone) | 20.0 g |
| acetic acid | 30.1 g |
| 5-nitro-indazole | 1.15 g |
| diethylene glycol to make 100 ml | |
| concentrated part C | |
| glutamic dialdehyde 50% solution) | 17.8 g |
| potassium metabisulphite | 26.0 g |
| water to make 100 ml | |

For initiation of the processing the three parts were mixed in the following ratio: 250 ml of part A, 700 ml of water, 25 ml of part B and 25 ml of part C. No starter solution was added. A pH of 10.40 at 25° C. was measured.

| Composition of fixer II (containing a hardener) | |
|---|---|
| concentrated part A | |
| amnoniumthiosulphate (78% solution) | 661 g |
| sodium sulphite | 54 g |
| boric acid | 25 g |
| sodium acetate trihydrate | 70 g |
| acetic acid | 40 g |
| water to make 1 liter | |
| pH adjusted with acetic acid to 5.30 at 25° C. | |
| concentrated part B | |
| water | 150 ml |
| acetic acid | 10 g |
| sulphuric acid | 13 g |
| aluminium sulphate (34% solution) | 27 g |
| water to make 250 ml | |

The fixer ready for use was then made by mixing concentrated part A, water and concentrated part B in the following ratio: respectively 250 ml, 687.5 ml and 62.5 ml. A pH of this mixture of 4.25 at 25° C. was measured.

Densities at λ-max of the dyes after processing are given in Table IV.

TABLE IV

| Evaluation of the optical densities of the dyes. | | |
|---|---|---|
| | coated dye amount in | optical density at λ-max after processing cycle |
| Dye No. | g/m² per side | 90 s    38 s |
| 1 (invention) | 0.039 | 0.000    0.015 |
| 2 (comparison) | 0.063 | 0.000    0.015 |
| 3 (comparison) | 0.025 | 0.005    0.025 |

As can be seen from Table IV, even in the 38 s-processing cycle the optical density at the maximum absorption wavelength is reduced to an acceptable level, especially for dyes No. 1 and 2.

4. Evaluation of the photographic properties of the dyes in an anti-cross-over layer.
  Coating procedure
  The coatings of item 3 were repeated, except for the addition of 470 mg per mole of AgNO₃ of the emulsion of the spectral sensitizer anhydro-5,5'-dichloro-3,3'-bis(n.sulfobutyl)-9-ethyloxacarbo-cyanine hydroxide. In addition a coating without a dye added to the anti-cross-over layer was performed as a reference.

Exposure, sensitometric and densitometric data:
Samples of those coatings were exposed with green light of 540 nm during 0.1 seconds using a continous wedge and were processed during the 90 seconds cycle described below. The density as a function of the light dose was measured and therefrom were determined the following parameters:

fog level (with an accuracy of 0.001 density), the relative speed S at a density of 1 above fog (the sample with the comparative example was adjusted to a relative speed value of 100), Determination of the cross-over percentage:

The cross-over percentage (% cross-over) was determined as follows. The double side coated samples were adjusted between a single green light emitting screen (CURIX ortho Regular: Agfa-Gevaert trade name) and a white paper, replacing the second screen. This film-screen element, directed with its light emitting screen to the X-ray tube, was then exposed with varying X-ray doses, expressed as log E. After processing these samples in the 90 seconds cycle, the minimal dose (log E) needed to obtain a density of 0.5 above fog was determined for the frontlayer (log E front) and the backlayer (log E back) separately. The cross-over percentage was then calculated according to the following equation:

% cross-over = 100/antilog(logE back − logE front)

In table V the results of these photographic tests are tabulated.

TABLE V

Photographic effect of the dyes in an anti-crossover layer: sensitometry and cross-over percentage.

| sample Dye No. | coated dye amount per side (g/m²) | fog | sensitometry speed | % cross-over |
| --- | --- | --- | --- | --- |
| no dye (reference) | 0 | 0.016 | 100 | 40 |
| dye 1 (invention) | 0.039 | 0.017 | 85 | 30 |
| dye 2 (comparison) | 0.063 | 0.017 | 89 | 31 |
| dye 3 (comparison) | 0.025 | 0.017 | 83 | 28 |

This table shows that the dyes (invention and comparative examples) significantly reduce the cross-over percentage with an acceptable decrease in sensitivity. It is further shown that fog is not influenced in the presence of the dyes, and that even with a significantly lower coating weight, the dye according to the invention shows a similar crossover percentage as dye 2 used in the comparative coating. Besides even versus dye 3, which is coated in a lower amount and which shows similar sensitometric results and cross-over characteristics as the dye according to the invention, the decolourizing properties are better, especially for shorter processing cycles, e.g. the 38 s cycle, as has been shown in Table IV hereinbefore.

We claim:

1. A photographic material comprising a support and at least one light-sensitive silver halide emulsion layer characterised in that it comprises in a hydrophilic colloid layer at least one filter dye corresponding to the following general formula (I):

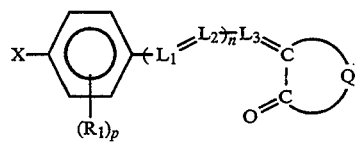

(I)

wherein n represents 0 or 1;

p represents 0, 1 or 2;

Q represents the atoms necessary to form an acidic nucleus;

$R_1$ represents hydrogen, substituted or unsubstituted alkyl, substituted or unsubstituted aryl, $COOR_2$, $NHCOR_3$ or $NHSO_2R_4$ with $R_2$ representing hydrogen or substituted or unsubstituted alkyl, $R_3$ and $R_4$ representing substituted or unsubstituted alkyl, or substituted or unsubstituted aryl, X represents $OR_5$, $SR_5$ or $NR_6R_7$ wherein $R_5$ represents H, substituted or unsubstituted alkyl, substituted or unsubstituted aryl and each of $R_6$ and $R_7$ which may be the same or different represents hydrogen, substituted or unsubstituted alkyl, substituted or unsubstituted aryl or the necessary atoms to form a ring together with the N-atom to which they are attached and the C-atom of the phenylene ring in ortho position with respect to said N-atom;

$L_1$, $L_2$, $L_3$ represent substituted or unsubstituted methine with the proviso that at least one of $L_1$, $L_2$ or $L_3$ must be substituted by $-COOR_8$;

$R_8$ represents hydrogen, substituted or unsubstituted alkyl, substituted or unsubstituted aryl, $NH_2$, $NHR_9$, $NR_{10}R_{11}$ with $R_9$, $R_{10}$ and $R_{11}$ representing a substituted or unsubstituted alkyl, or a substituted or unsubstituted aryl and wherein at least one of $R_1$ to $R_{11}$ contains an ionizable group.

2. A photographic material according to claim 1 wherein said dyes are corresponding to the following formula (II):

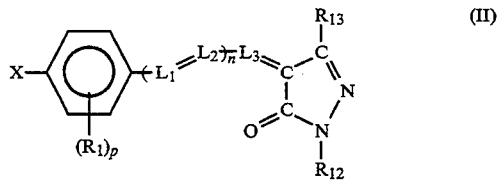

(II)

wherein each of n, p, X, $R_1$, $L_1$, $L_2$ and $L_3$ has one of the meanings given in claim 1 and wherein $R_{12}$ represents hydrogen, substituted or unsubstituted alkyl, substituted or unsubstituted aryl, or sulfolanyl, $R_{13}$ represents hydrogen, substituted or unsubstituted alkyl, substituted or unsubstituted aryl, $COOR_2$, $NHCOR_3$, $NHSO_2R_4$, with $R_2$, $R_3$ and $R_4$ representing hydrogen, substituted or unsubstituted alkyl, or substituted or unsubstituted aryl, and wherein at least one of $R_1$ to $R_{13}$ contains an alkali-soluble group.

3. A photographic material according to claim 1 wherein said at least one filter dye is incorporated into an antihalation undercoat layer coated between the support and at least one silver halide emulsion layer.

4. A photographic material according to claim 1 wherein said at least one filter dye is incorporated into a backing layer.

5. A photographic material according to claim 1 wherein the dye(s) is(are) present in a hydrophilic colloid layer in an amount of 0.01 to 1.0 mmole/m².

6. A photographic material according to claim 1 wherein the filter dye(s) is(are) present as a gelatinous dispersion(s).

7. A photographic material according to claim 1 wherein the filter dye(s) is(are) present as solid silica particle dispersion(s).

8. A photographic material according to claim 1 wherein said photographic material is an X-ray material.

9. Use of a photographic material according to claim 8 for rapid processing applications shorter than 60 seconds, comprising the developing, fixing, rinsing and drying steps.

10. A photographic material according to claim 1 wherein, in said dyes according to the general formula (I), Q represents the atoms necessary to form an acidic nucleus selected from the group consisting of pyrazolone, barbituric acid, thiobarbituric acid, rhodanine, hydantoine, oxazolidindione, thio-oxazolidindione and isoxazolinone.

11. A photographic material according to claim 1 wherein, in said dyes according to the general formula (I), $R_6$ and $R_7$ together represent the necessary atoms to form a ring with the N-atom to which they are attached.

* * * * *